United States Patent
Diab (10) Patent No.: US 8,768,567 B2
(45) Date of Patent: Jul. 1, 2014

(54) INTELLIGENT POWER AND CONTROL POLICY FOR AUTOMOTIVE APPLICATIONS

(71) Applicant: Broadcom Corporation, Irvine, CA (US)

(72) Inventor: Wael William Diab, San Francisco, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 13/671,713

(22) Filed: Nov. 8, 2012

(65) Prior Publication Data

US 2014/0121898 A1    May 1, 2014

Related U.S. Application Data

(60) Provisional application No. 61/719,581, filed on Oct. 29, 2012.

(51) Int. Cl.
    *G06F 7/00*    (2006.01)
    *G11B 20/00*    (2006.01)

(52) U.S. Cl.
    CPC ...... *G11B 20/00086* (2013.01); *G11B 20/0021* (2013.01); *G11B 20/00246* (2013.01); *G11B 20/00818* (2013.01); *G11B 20/00884* (2013.01)
    USPC ............. 701/36; 380/201; 380/210; 709/224; 707/752; 726/1

(58) Field of Classification Search
    CPC .................... G11B 20/00086; G11B 20/0021; G11B 20/00246; G11B 20/00818; G11B 20/00884
    USPC .................... 701/36; 713/300, 320, 321, 323; 375/130, 139, 142, 146, 150; 327/149, 327/189.05, 226; 714/14, 22; 380/34; 455/522

See application file for complete search history.

(56) References Cited

U.S. PATENT DOCUMENTS

| | | | |
|---|---|---|---|
| 7,778,420 B2 * | 8/2010 | Kocher et al. | 380/210 |
| 8,055,910 B2 * | 11/2011 | Kocher et al. | 713/193 |
| 8,131,646 B2 * | 3/2012 | Kocher et al. | 705/54 |
| 8,634,805 B2 * | 1/2014 | Raleigh | 455/406 |
| 2007/0033419 A1 * | 2/2007 | Kocher et al. | 713/193 |
| 2007/0081197 A1 * | 4/2007 | Omoigui | 358/403 |
| 2010/0070448 A1 * | 3/2010 | Omoigui | 706/47 |
| 2012/0191716 A1 * | 7/2012 | Omoigui | 707/740 |
| 2013/0082662 A1 * | 4/2013 | Carre et al. | 320/134 |

OTHER PUBLICATIONS

Barrass, Hugh et al., "Energy Efficient Ethernet", IEEE Tutorial, Jul. 16, 2007, US, 72 pages, available on-line at http://www.ieee802.org/802tutorials/07-July/IEEE-tutorial-energy-efficient-ethernet.pdf.

* cited by examiner

*Primary Examiner* — McDieunel Marc
(74) *Attorney, Agent, or Firm* — Garlick & Markison; Edward J. Marshall (57) ABSTRACT

In automotive networking applications, data about vehicle's environment is used in conjunction with a control policy to manage the performance and power usage of a networked device. The control policy can dynamically adjust the balance between link power and performance of the device's communications interface by taking into account the vehicles current situation and user preferences, e.g. location, destination, speed, and sensor status. In at least one disclosed implementation, controlling the balance between link power and performance of networked devices is important in maximizing power savings without unacceptably decreasing network performance.

20 Claims, 6 Drawing Sheets

FIG. 5 (control policy inactive)

FIG. 6 (control policy active)

FIG. 7

INTELLIGENT POWER AND CONTROL POLICY FOR AUTOMOTIVE APPLICATIONS

CROSS REFERENCE TO RELATED APPLICATIONS

This application claims the benefit of U.S. Provisional Application No. 61/719,581, filed Oct. 29, 2012 and entitled "INTELLIGENT POWER AND CONTROL POLICY FOR AUTOMOTIVE APPLICATIONS," which is incorporated herein in its entirety by reference for all purposes.

BACKGROUND

1. Field

This invention relates generally to networks used in automotive applications, and more particularly to power and control policies used in automotive data networks.

2. Related Art

Currently available power management and control policies used in automotive data networks are adapted from policies used in traditional data networks, such as enterprise systems, data centers, and access systems. Power management and control policies in both automotive communication networks and the traditional data networks focus on identifying the type of traffic (e.g. whether traffic is video or audio data) and on satisfying restraints imposed by applications running on networked devices (e.g. whether data to a mission critical application can be delayed). For example, current technology allows networked devices to be placed in a low power state when link utilization is low, i.e. there is little or no data traffic to or from the device. Likewise, when data traffic to or from a device has a low priority, the device can be placed in a low power state. If, however, link utilization is high, or the data traffic is high priority, the device is not placed in a low power state.

Various techniques are currently available for implementing low power states. For example, legacy Ethernet standards for interfaces of 100 Mbps generally incorporate an idle state that allows use of a low power state when link usage is low, but in practice only minimal power savings are achieved. Proposed IEEE 802.3az standard achieves power savings by sending only occasional transmission data bursts during a low power idle state. Proposed IEEE 802.3az standard also achieves power savings by powering down part of a network interface during the low power idle state. For higher speed Ethernet applications such as Gigabit Ethernet, some techniques achieve power savings by reducing the data transfer rate of one or more lanes of data, or by turning off some of the data lanes.

Regardless of the way in which a low power state is implemented, however, decisions about if and when to place a device in a low power state must still be made. This decision is complicated by the fact that a decision that incorrectly places a device in a low power state can cause unnecessarily long link startup and acquisition times. Similarly, a decision not to place a device into a low power state can result in unnecessarily high power usage. As previously mentioned, conventional power management and control policies focus on the amount of traffic being sent over a link, the type of traffic being sent over the link, or operating constraints imposed by applications running on networked devices. Use of these conventional network metrics may not result in optimum decision making in all situations. It is apparent, therefore, that currently available techniques for controlling the amount of power used by networked devices are less than perfect.

DETAILED DESCRIPTION

As used herein, the following terms are to be given their ordinary meaning, unless otherwise specified or apparent from the context in which the terms are used. The term "Automotive Area Network" ("AAN"), refers generally to a network such as that found in various automobiles, but can also refer to networks in vehicles other than automobiles, for example a motorcycle, a bus, an airplane, a boat or ship, or the like.

The terms "operating environment," "environment," and other similar terms are used to refer to the general situations, conditions, and other factors that may affect an automobile, or automotive area network 105, and which can be detected or determined by any of various sensors and subsystems included in automotive area network 105, or about which information can be provided by a driver or passenger. Thus, in its broadest sense, the term operating environment includes driver and passenger profiles and preferences, also referred to herein as vehicle-occupant profiles and preferences. The operating environment of an automobile can include, for example, a location of the vehicle, a length of time the vehicle has been in operation, whether or not the vehicle is in motion, a speed or acceleration of the vehicle, the number of passengers in a vehicle, an internal or external temperature, a functional status of the vehicle or any of the vehicles systems, subsystems, devices, or sensors, a time of day, a distance to or estimated time of arrival at an intended destination, and so on. Information about the operating environment of a vehicle can be obtained, for example, directly from user input, measurement devices and sensors, or calculated based on user input and sensor measurements.

Figure 1:
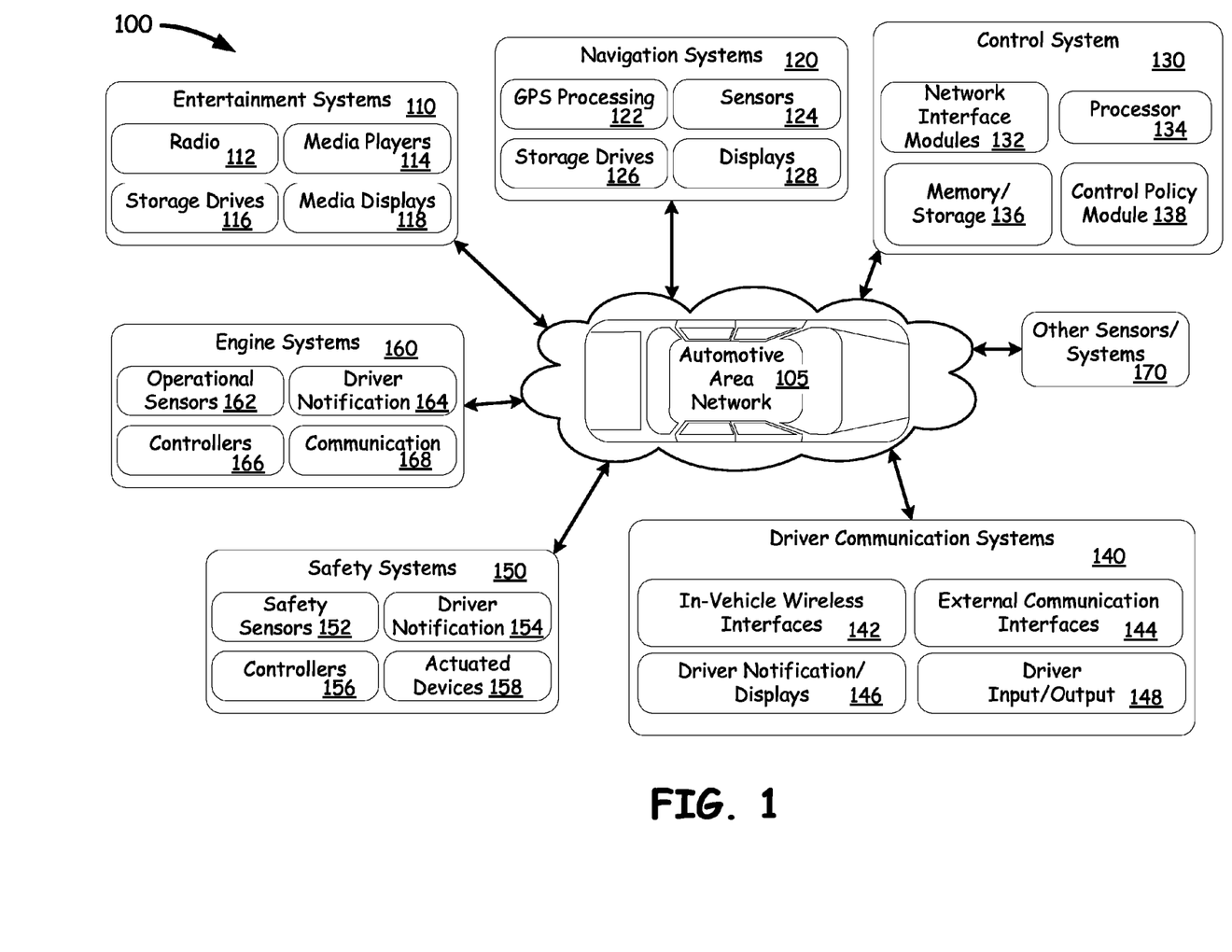
FIG. 1 is a diagram illustrating an Automotive Area Network (AAN), according to various embodiments of the disclosure.

Referring first to FIG. 1, a system 100 including an automotive area network (AAN) 105 is illustrated according to various embodiments of the present disclosure. Automotive area network 105 includes entertainment systems 110, navigation systems 120, control system 130, driver communication systems 140, safety systems 150, engine systems 160, and other sensor systems 170. The systems can communicate with each other, and in some cases other portions of the automobile and external systems and networks, via AAN 105, using any of various suitable communication protocols. For example, in some embodiments each of the subsystems connected to AAN 105 are capable of communicating via communication links conforming to one or more of various standards such as: IEEE 802.3ba, which describes 40 and 100 Gb Ethernet (GbE); IEEE 802.5, which defines token ring; IEEE 802.6, which defines Fiber Distributed Data Interface (FDDI); IEEE 802.11, which describes wireless Ethernet standards; and the like. In some embodiments, the various subsystems within AAN 105 are connected to allow direct communication between subsystems, with subsystem controllers (discussed subsequently with respect to FIG. 3) handling communications within a subsystem using the same or a different protocol independent of the overall protocol used by AAN 105 for communication between subsystems. In other embodiments, subsystems and devices are connected to allow direct communication between devices or subsystems. Yet other embodiments employ various hubs, routers, gateways, or other intermediate data communication nodes to facilitate either direct or proxy type communications between devices and subsystems connected to AAN 105. In embodiments employing hubs, routers, gateways or the like, any or all of the hubs, routers, gateways can be included as separate subsystems (not illustrated), or included in any or all of the various illustrated subsystems.

Each of the various systems illustrated in FIG. 1 can provide dedicated functionality tailored to a particular purpose, or provide general functionality that can be altered based on network loading or other operational requirements. For example, entertainment system 110 can provide entertainment to passengers with the driver of the vehicle in which AAN 105 is implemented, while Navigation systems 120 can provide dedicated navigation functionality. In other embodiments, however, the display of media and navigation information can be shared between Entertainment systems 110 and Navigation systems 120, or other systems, and resources from one system can be used by another system. Note that although not specifically illustrated, the various subsystems, include network interface modules that allow the subsystems to be coupled to AAN 105.

As illustrated in FIG. 1, entertainment system 110 can include radio 112 for receiving and presenting radio broadcasts; media players 114 for playing back stored media content; storage drives 116 for storing media to be played back; and media displays 118 for outputting media obtained from radio 112, media players 114, and storage drives 116, to a driver or passenger.

Navigation system 120 includes global positioning system (GPS) processing 122; position, speed, location, and GPS sensors 124; storage drives 126, for use in storing maps, favorite locations, and the like; and displays 128 for displaying maps routes or other navigation related information.

Driver communication systems 140 can include in-vehicle wireless interfaces 142, which permit a driver and passengers to interface their personal communication devices, such as smart phones, wireless phones, laptops, personal digital assistants, or the like, to automotive area network 105. In some embodiments, in-vehicle wireless interfaces 142 also enables interfacing user devices to media displays 118, storage drives 116, media players 114, or radio 112 of entertainment systems 110. Driver communication systems 140 also includes external communication interfaces 144, which provides communications with networks external to AAN 105, such as a mobile telecommunication network or an external hotspot established either within or outside of a vehicle implementing AAN 105. External communication interfaces 144 can also include various plugs, cables, adapters, switches, or the like, used to facilitate hardwired connection of driver or passenger devices to automotive area network 105

Driver communication systems 140 also includes driver input/output modules 148, which can include microphones to permit a driver or passenger to issue verbal commands to one or more devices, buttons, switches, knobs, or various user selectable objects presented on graphical user interfaces, displayed via media displays 118 included in entertainment systems 110, displays 128 included in navigation systems 120, or displays, keypad, and the like otherwise available via AAN 105. Driver communication systems 140 also include driver notification/displays 146, which can be used in place of, or in addition to, the various other displays, inputs, and outputs available via AAN 105.

Safety systems 150 include safety sensors 152, which can include airbag sensors, speed sensors, accelerometers, positional sensors and backup cameras, or the like. Driver notification module 154, also be included in safety systems 150, can be used in place of, or in addition to, other notification devices and modules included in other subsystems. Safety systems 150 also include various actuated devices 158, such as airbags, and controllers 156, such as traction control systems, adaptive steering and headlamps, cruise control, or the like.

Engine systems 160 can include operational sensors 162, such as oxygen sensors, fuel sensors, voltage sensors, and other sensors known to those of skill in the automotive parts. Driver notification devices or modules 164 can include various lights, gages or other similar devices, and may use displays in other subsystems, for example navigation subsystem 120 displays 128, and entertainment systems 110 media displays 118, to provide notifications to vehicle occupants. Controllers 166 can include control modules used to control various engine functions, and can include a microcontroller designed to adjust engine functionality based on information provided by various sensors and vehicle subsystems.

Other sensors and systems 170 can include various sensors, switches, and measurement devices, for example door open/close sensors, thermostats, thermometers, resistance or conductivity sensors used to detect the failure of a headlamp, overhead light, or other illumination device, current sensors, voltage sensors, tire pressure sensors, light sensors used to activate headlights during periods of low light, and so on. Note that many of the other sensors/systems 170 can also be included in operational sensors 162.

Control system 130 can include network interface modules 132, one or more processors 134, memory/storage 136, and control policy module 138. In various embodiments, control system 130 operates to implement a control policy for AAN 105, in which a balance between performance and power usage is established for each device individually, for each subsystem individually, for devices within each subsystem as an aggregate, and/or for all subsystems as a whole.

Control policy module 138 can be used to select and implement a control policy based on a number of factors, including the current operating environment of the vehicle, an operating history of the vehicle, an environmental history, a performance or power usage history of AAN 105, data types, data usage, user preferences, the type of traffic being carried within any or all particular subsystems of AAN 105, response time requirements for particular devices, or the like. Memory/ storage 136 can be used to store a history of the vehicle operation, one or more control policies, parameters, vehicle sensor data and similar sensor information, driver and passenger preferences, factory defaults, network configurations, and other information that can be used to allow control policy module 138 to select and implement one or more control policies based on the current conditions or operating environment of AAN 105.

In some embodiments, control system 130 has explicit control over a subsystem, while in other embodiments the subsystem itself controls its power state as directed by control system 130. For example, if a selected control policy indicates that the storage drives 116 are to be operated in a low power state, control system 130 can send a control message to entertainment systems 110, through network interface modules 132, notifying entertainment system 110 that power-up of storage drives 116 should be delayed, or that storage drives 116 should be powered up only into a low power or standby state. In some embodiments, a control policy may dictate that a standby state includes a state in which the frequency and type of communications with a particular device or subsystem are limited by turning on physical layer (PHY) circuitry of a communications module only periodically. In other embodiments, a low power state allows power-up of the PHY circuitry, but prevents power up of some or all of the higher level circuitry of the device.

In some embodiments, control system 130 has explicit control over a subsystem, while in other embodiments the subsystem itself controls its power state as directed by control system 130. For example, if a selected control policy indicates that the storage drives 116 are to be operated in a low power state, control system 130 can send a control message to entertainment systems 110, through network interface modules 132, notifying entertainment system 110 that power-up of storage drives 116 should be delayed, or that storage drives 116 should be powered up only into a low power or standby state. In some embodiments, a control policy may dictate that a standby state includes a state in which the frequency and type of communications with a particular device or subsystem are limited by turning on PHY circuitry of a communications module only periodically. In other embodiments, a low power state allows power-up of the PHY, but prevents power up of some or all of the higher level circuitry of the device.

Where a device or subsystem receives power over Ethernet according to a standard such as IEEE 802.3af, the control policy being implemented by control policy module 138 can specify that the device is not to receive power over Ethernet until further notice from the controller, or until a set period of time has elapsed. However, even when power over Ethernet is disabled, communications modules of the same device can be otherwise fully powered to permit quick response to commands and other communications.

Also consider the following example, which occurs during a network initialization where each device or subsystem is listening for an initial power-state command. Control system 130 can issue a "delay power-up" command to a digital video disk (DVD) player included in media players 114. The command can be intercepted by a proxy power controller (not illustrated) included in entertainment systems 110, or received directly by the DVD player. If received by the DVD player, the command can be received via a primary communication link to AAN 105, or via a dedicated control line. The DVD player can respond to the command issued by control system 130 by delaying powering on anything beyond the most basic communications circuitry, which would still that allows media players 114 to wake up from a sleep state.

In some embodiments, the DVD player can include memory that stores all or part of a control policy associated with a policy identifier. The command from control system 130 can include the policy identifier, thereby allowing the DVD player to identify the proper control policy, and boot to a power state specified by the control policy. In other embodiments, the DVD player includes at least a part of a control policy designated as a default control policy, and boots to the power state specified by the default control policy. In some embodiments, the DVD player can be configured to always boot to a low power state, in which only basic power state or wakeup messages are processed by a PHY of the DVD player.

A control policy can also be used to govern a power up or shut down sequence of a vehicle implementing automotive area network 105. Furthermore, control policies that include commanding a device or subsystem to delay or prohibit full power up can include timing information and parameters allowing initiation of a power up sequence after a specified delay.

Different control policies can be selected for different operating environments, but a single control policy can also be used. For example, the power state of a device can be altered by a single control policy when other sensors/systems 170 indicate that the temperature falls below a threshold value Likewise, a single control policy can specify different power states for different devices depending on whether the battery voltage in an electric vehicle implementing automotive area network 105 is below or above a threshold level.

Control policy module 138 can both select and implement control policies using control processor 134 and/or circuitry included in control policy module 138. Thus, for example, if control system 130 receives information from a subsystem of AAN 105, e.g. from an operational sensor 162 included in engine systems 160 subsystem, control policy module 138 can select a different control policy than it would select under different environmental conditions as indicated by operational sensor 162.

In various embodiments, a driver can select a profile to be used conditionally by AAN 105. For example, a driver who has children as passengers in the back seat of a vehicle, may select a control profile or policy for AAN 105 that is "entertainment centric." That is to say, the driver may select a default profile in which entertainment systems 110 is fully powered up for fast response, even though a control policy based strictly on vehicle conditions might indicate that entertainment systems 110 should not be fully powered up. The driver can also condition the profile on presence of certain environmental factors, so that if no children are present in the vehicle, the entertainment centric profile will not be selected; instead a "low power" profile will be used.

Even where driver or passenger preferences are used to override system selected control policies in whole or in part, some embodiments enable a system override of user preferences under limited circumstances. For example, a user preference may indicate that a control policy requirement for power savings should be ignored, and that entertainment systems 110 are to be fully powered up. The system control policy can specify that the user preferences are allowed to override the selected control policy if available battery power is below a first threshold, but above a second threshold.

Figure 2:
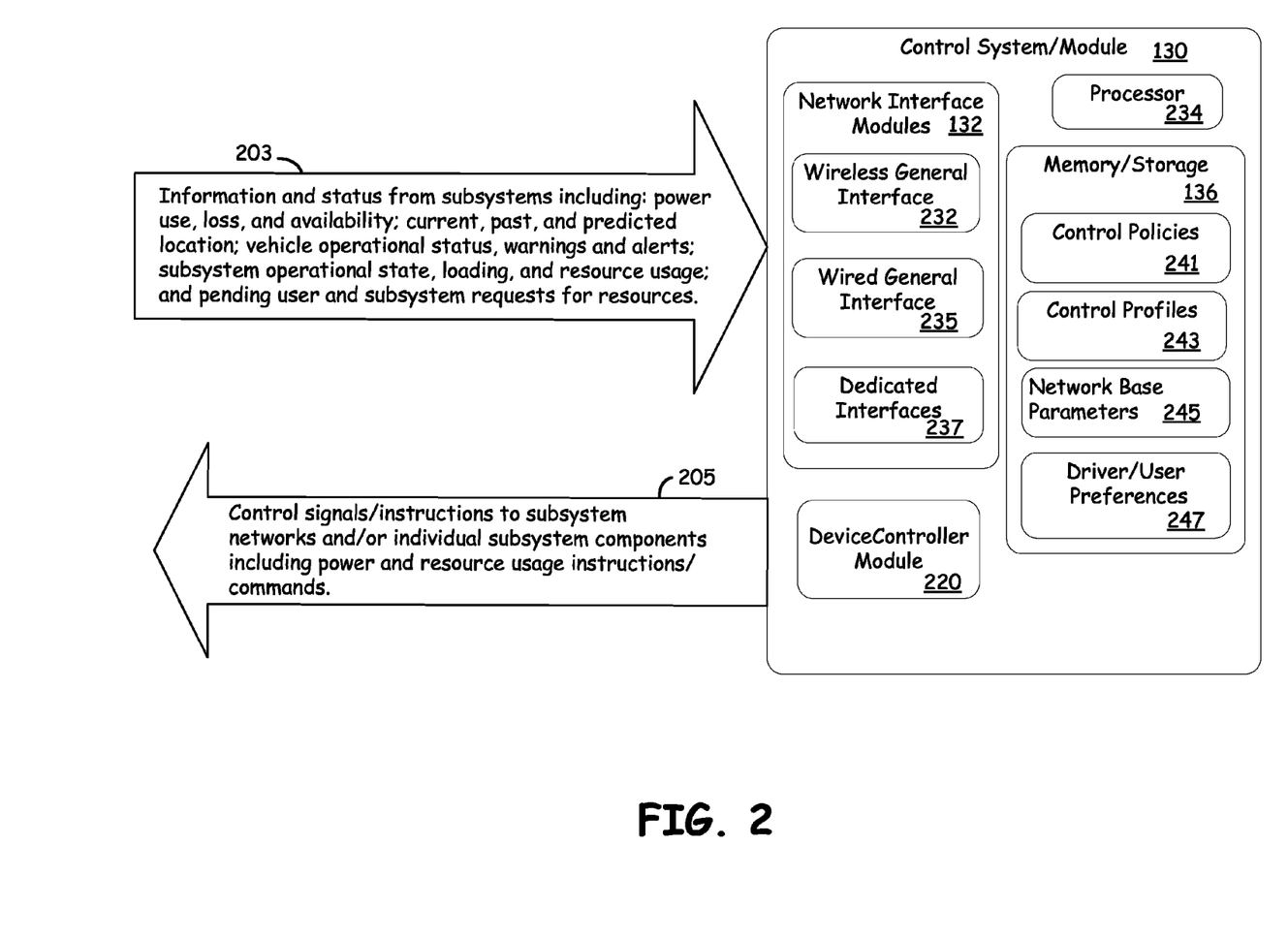
FIG. 2 is a diagram illustrating a control system/module used to select and implement control policies within an AAN, according to various embodiments of the disclosure.

Referring next to FIG. 2, a control system/module 130 is illustrated and discussed according to various embodiments of the disclosure. Control system module 130 includes processor 234, memory/storage 136, network interface modules 132 and device controller module 220. Status information 203 indicating the current operating environment of AAN 105 is received by network interface modules 132, which can include a wireless general interface 232, a wired general interface 235, and dedicated interfaces 237. The wireless general interface 232 and the wired general interface 235 can be used to communicate with any number of different devices connected to AAN 105, while dedicated interfaces 237 can include either wireless or wired interfaces configured to communicate directly with specific devices or subsystems. Thus, a dedicated interface for a media device could be used strictly for communication with that media device, whereas a wired general interface 235 could be used to communicate with any device or subsystem connected to AAN 105. Various devices and subsystems can include both dedicated interfaces 237 and wired or wireless general interfaces 235, so that control system/module 130 can communicate with those devices via multiple different pathways.

Device controller module 220 can be used to send instructions 205 over dedicated control links to specific devices or subsystems. In some embodiments, in addition to or in place of specifically dedicated control links, device controller module 220 generates instructions 205 and delivers them through network interface modules 132, over either dedicated interfaces 237, wired general interface 235, or wireless general interface 232.

Processor 234 can include one or more general purpose processors, special-purpose processors, circuitry, hardware, and/or firmware and software, to implement various embodiments disclosed herein. Generally, processor 234 works in conjunction with memory/storage 136 to select and implement control policies used to control a balance between power usage and performance of either individual devices, subsystems and other collections of devices, and portions of communication modules or circuitry associated with particular devices or subsystems. Memory/storage 136 includes control policies 241, control profiles 243, network-based parameters 245, and driver/user preferences 247.

Control policies 241 include policies that govern, in conjunction with information 203, the power state of some or all devices and subsystems connected to AAN 105. Control policies 241 can include multiple different control policies, including: a default control policy, which may specify a balanced approach to power efficiency and communication response times; a safety control policy that overrides a currently operating control policy during an accident or emergency situation to power down nonessential subsystems or devices; a performance policy that maximizes device or subsystem responsiveness and performance at the cost of added power usage; a power saving policy that maximizes power savings at the expense of device or subsystem responsiveness; a home policy that delays activation of various media players if the vehicle is located within a threshold distance of the drivers home, as indicated by GPS data and information stored in a navigation subsystem; a long-trip policy that gives priority to particular media devices in the navigation subsystem if an estimated trip length exceeds a preferred threshold, or the like.

Each of these control policies can be implemented as specified by a user preference, a master control policy, or a control policy profile. In some embodiments, a control policy can be stored in firmware, or hardwired to be constantly active, but achieve different results based on network parameters stored in network base parameters 245, control profiles 243, or driver user preferences 247. Specific types of control policies can also be assigned to control profiles. Each control profile can specify particular control policies to be selected under particular operating environmental conditions, and can be specified by user preferences. Thus, for example, two different drivers can have control profiles stored on the same vehicle, with the control profile for one driver indicating that the long-trip control policy is to be used regardless of the estimated trip length, while the control profile for the other driver indicates that a power saving control policy should be used at all times.

Control profiles 243 are closely related to driver/user preferences 247, and in some cases can be considered to be an instance of driver/user preferences 247. The term "driver/user preferences" is generally intended to encompass various threshold settings selected, provided, or indicated by a driver, passenger or other user. Driver preferences can be included in one or more control policies 241, or can be used to alter or override a control policy. The term "control profile," however, is used generally to refer to a profile that specifies conditions under which a particular control policy is to be selected or implemented. Said another way, a control profile may indicate user preferences specifying the circumstances or operational environment under which a particular control policy is to be selected. For example, a "near-home" control policy can indicate a power usage profile for the AAN 105, while a "home" profile can include a geographic location of the "home," and specify a threshold radius around "home" in which the "near-home" profile is to be used. Driver/user preferences 247 can include information specifying the address of "home" and the threshold radius. Thus, a "home" profile can be used to dictate when a "near-home" control policy to be used, based on the driver/user preferences 247 specifying a maximum distance from "home" that is still considered to be "near-home."

Driver/user preferences 247 can also specify how "sticky" a control policy should be. For example, a "performance priority" control policy may initially give media performance precedence over power savings, and specify that all media devices in a vehicle are to be powered up and ready for rapid response. A user preference indicating a "stickiness" of the "performance priority" control policy can specify that if 30 minutes have elapsed since any of the media players in a backseat of the vehicle have been used, the automotive area network can change the "performance priority" control policy to a "no backseat media" control policy, to conserve power or other network resources. Alternatively, the driver preference can specify that the "performance priority" control policy is not to be changed regardless of how long the vehicle has been in operation. A control profile can also specify how sticky any given control policy is.

Driver or passenger input can also be used to change the control policy in use, or to override a portion of a current control policy. A history of driver interactions, control policy changes, overrides, and the like can be stored in memory/storage 136, and be used to adjust default control policies and profiles, or to create additional control policies 241 and control profiles 243.

In some instances, sensor information can be used to provide information about whether there are passengers in the car, and a control profile can be selected and implemented accordingly. For example, a switch or sensor on the passenger doors of a vehicle indicate that the passenger doors have not been opened within 5 minutes prior to the vehicle being started, a "no-passenger" control policy can be selected. Such a "no-passenger policy can specify that media devices accessible only to passengers should be kept in a low power state. Similarly, if a front seat passenger airbag sensor indicates that there is no passenger in the front seat, a "no-front-seat-passenger" control profile, in which passenger input devices remain in low-power states, can be used.

Control policy or profile can be specific to a particular device, to a particular group of devices, to a particular type of device, to a particular subsystem, or some combination thereof. In some embodiments, current, past, and estimated power usage of the various subsystems and devices can be displayed to a driver or passenger to allow the driver or passenger to select either a control profile or policy, a stickiness setting for a control profile or policy, or various threshold values used by control policies and profiles.

Network base-parameters 245 can be used to provide parameters of fixed communication links between various devices and subnetworks of automotive area network 105 to provide for faster startup and link acquisition times. In many instances, the network base-parameters 245 can be altered based on a history of link or network performance values.

Control system module 130 can evaluate the operating environment of a vehicle including automotive area network 105 on a continuous, periodic, event-triggered, or on-demand basis. For example, various sensors can be used to monitor the speed, direction, tire pressure, status of the electrical system, number of passengers, estimated arrival time, time of day, or other conditions related to the vehicle. Depending on the selected control policy 241, the selected control profile 243, the driver/user preferences 247, and input from the vehicle, a new control policy or profile can be selected, or the current control policy or profile can be altered.

The relationship between performance and power usage can be dynamically rebalanced to account for changes in the operating environment of the vehicle carrying automotive area network 105. Thus, for example, a current control policy can be evaluated in response sensors detecting that a passenger door has been opened, the vehicle's fuel tank is refilled, a threshold number of miles traveled is exceeded, cruise control on the vehicle is set, or upon the occurrence of other similar conditions or changes in conditions. In some instances, the rate of change of an operational environment, can also trigger altering a balance between power and performance. For example, a change in vehicle speed or acceleration, can trigger rebalancing. Additionally, measurements indicating that a vehicle has been traveling at freeway speeds for over an hour can cause an automotive network controller to switch control policies, subject to driver or passenger preferences.

Figure 3:
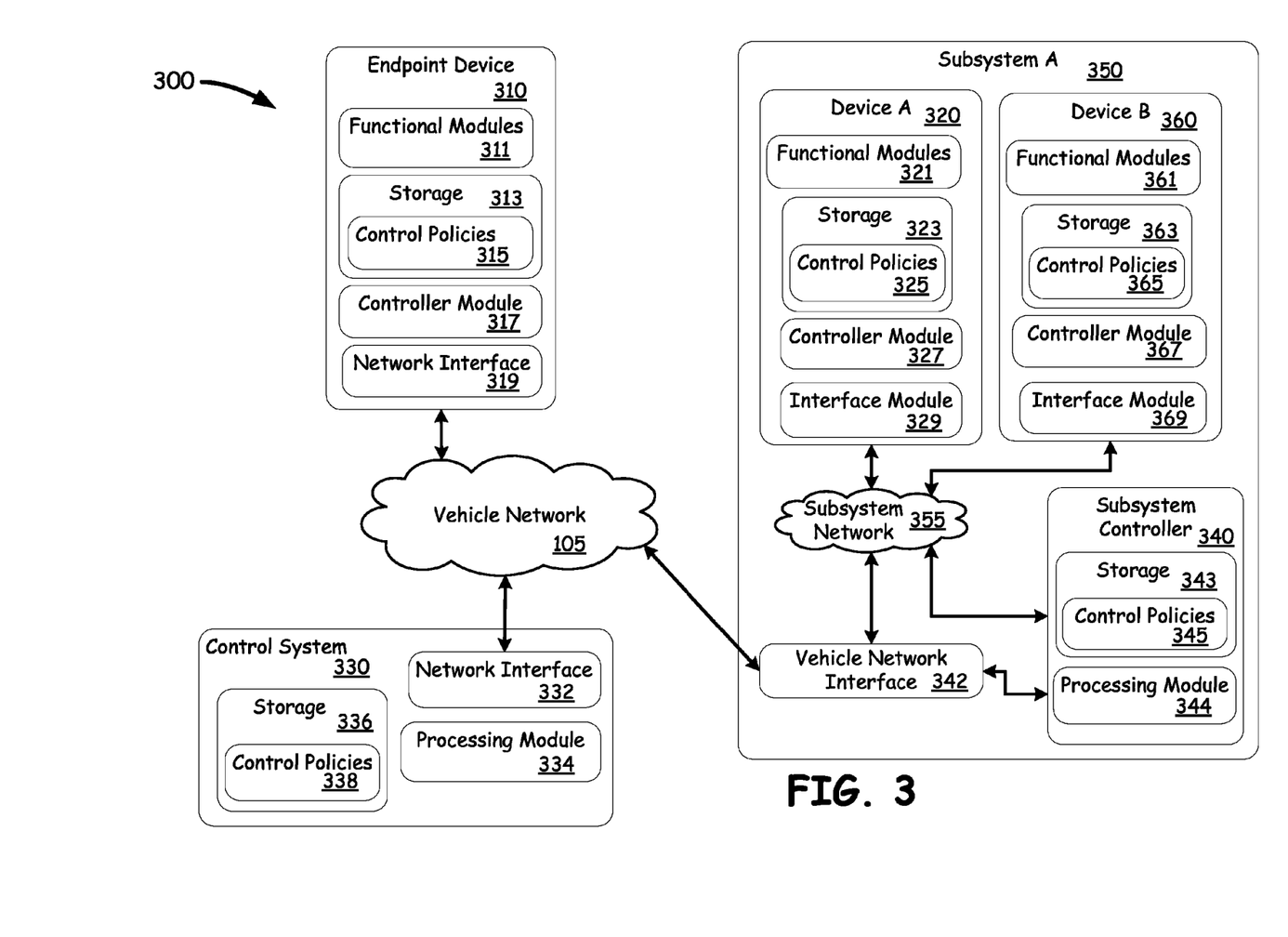
FIG. 3 is a diagram illustrating an AAN that includes a control system, networked endpoint devices, and networked subsystems, any or all of which can be configured using a unified control policy under the direction of a controller, controller module, or control system, according to various embodiments of the disclosure.

Referring next to FIG. 3, a system 300 is illustrated and discussed according to various embodiments of the present disclosure. System 300 includes vehicle network 105 coupled to an individual endpoint device 310, subsystem A 350, and control system 330. Endpoint device 310 can include functional modules 311, which perform the primary functions of endpoint device 310; storage 313, which can include storage for control policies 315; controller module 317; and network interface 319.

Subsystem A 350 includes two devices: device A 320, and device B 360. Device A 320 includes functional modules 321 storage 323 which include storage for control policies 325 controller module 327 interface module 329. Device B 360 includes functional modules 361; storage 363, including storage for control policies 365; controller module 367; and interface module 369. Device A 320 and device B 360 are coupled to subsystem controller 340 through subsystem network 355, which in turn is coupled to vehicle network 105 through vehicle network interface 342. Subsystem controller 340 includes storage 343, which includes storage for control policies 345 and a processing module 344.

Control system 330, which is also coupled to vehicle network 105, includes storage 336, including storage for control policies 338; network interface 332; and processing module 334. In some embodiments, control system 330 determines and specifies the control policies 338 to be implemented by both endpoint device 310 and subsystem A 350. Control system 330 can also determine and implement control policies 338 to be used by devices within subsystem A 350, but in some cases subsystem controller 340 is responsible for implementing control policies for devices with subsystem A 350 in accordance with a local control policy.

In an example of operation, control system 330 selects a control policy and notifies subsystem A 350 of an overall system control policy that has been selected for use. Subsystem A 350 then selects a local control policy based on the system control policy and directs device A 320 and device B 360 to implement the selected control policy. In some embodiments, subsystem controller 340 provides device A 320 and device B 360 with the control policy to be implemented by each device, which can be the same control policy, or different control policies, depending upon whether the control policy is device or device type specific, or applies to all devices within subsystem A 350.

In other implementations, subsystem controller 340 does not provide device A 320 and device B 360. Instead, each device selects a device control policy based on information received from subsystem controller 340. For example, device A 320 can select an appropriate control policy 325 from storage 323, while device B 360 selects an appropriate control policy 365 from storage 363. Controller module 327, included in device A 320, and controller module 367, included in device B 360, can be used to select and implement device specific control policies in much the same way as control system 330 does, but using information from subsystem controller 340, control system 330, in addition to information about a vehicles operational environment.

Interface modules 329 and 369, are used to provide communications to subsystem controller 340 through subsystem network 355. In various embodiments, interface modules in either or both device A 320 and device B 360 can be dedicated connections to subsystem controller 340 or general purpose communication connections. Also note that in some embodiments, subsystem controller 340 can implement a control policy 345 that prevents device A 320 from powering up, or requires device A 320 to power up into a low-power mode, while allowing device B 360 to fully power up. In other embodiments, although not specifically shown, device A 320 and device B 360 in subsystem A 350 can also have direct connections to network control system 330, so that network control system 330 can, depending on the control policy being implemented, control devices within subsystem A 350 directly, or allow subsystem controllers 340 to control devices within the subsystem.

In some such embodiments, control system 330 can prevent vehicle network interface 342 from completely powering up, and from providing power to subsystem controller 340. In this way, when subsystem A 350 remains unpowered, and only a portion of the communication modules within vehicle network interface 342 are powered up, the other devices within subsystem A 350 can remain in a low-power, or power off state, leaving even interface modules 329 and 369 powered down almost completely. Leaving the entire subsystem A 350 in a low power state, except for a portion of the communication interface for vehicle network interface 342, can provide extra power savings in some circumstances.

Endpoint device 310 includes a controller module 317 and a network interface 319. Control system 330 can notify endpoint device 310 of the proper control policy to implement via network interface 319, and endpoint device 310 can select and implement the control policy using controller module 317. In some such instances, endpoint device 310 can place its own network interface 319 in a low-power state, and only periodically check for messages from vehicle network 105. In various embodiments, separate links can be provided to some or all endpoint devices to allow for a wake-up command to be sent via a back channel. In other embodiments, however wake-up techniques employing the primary network link, such as those used to wake up devices via an Ethernet link, can be used.

Figure 4:
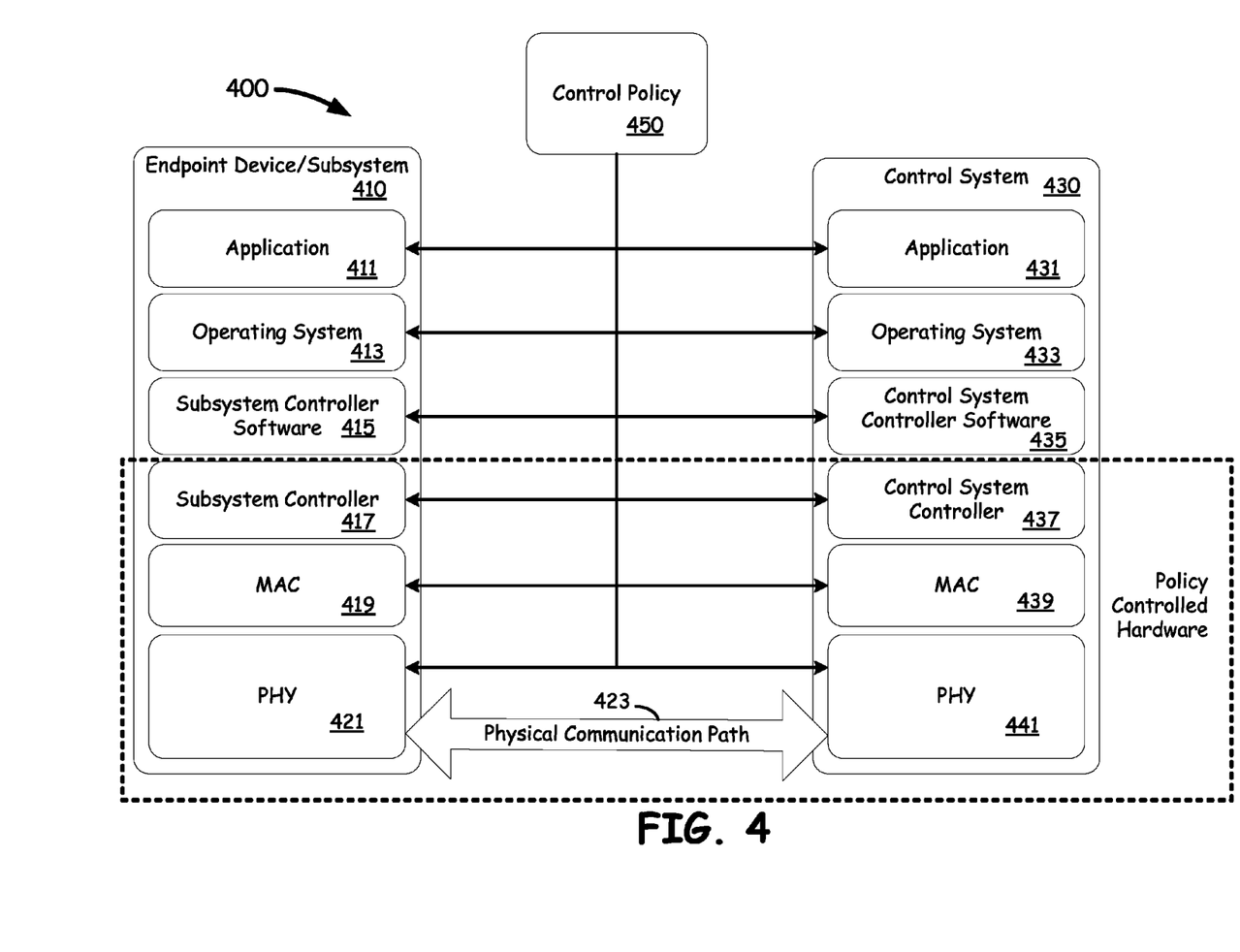
FIG. 4 is a diagram illustrating a communications link, or channel, between a control system and an endpoint device/subsystem, where the power and functionality of the link, or channel, is controlled by implementing a control policy controlling hardware, software, applications, or some combination thereof, according to various embodiments of the disclosure.

Referring next to FIG. 4, a system 400 is illustrated and discussed according to various embodiments of the present disclosure. System 400 includes an endpoint device/subsystem 410 and a control system 430, both under control of control policy 450. Control policy 450 can be implemented by endpoint device/subsystem 410 itself, by control system 430, or by another device. In some instances, control policy 450, in addition to controlling the power state of various portions of endpoint device/subsystem 410 also controls the power state of various hardware and software portions of control system 430. Thus, for example, a data link established via physical communication path 423, between the PHY circuitry 441 of control system 430 and the PHY circuitry 421 of endpoint device/subsystem 410, can be placed in a low-power state by appropriately controlling PHY circuitry 421 and 441. Various techniques for placing PHY circuitry 421 and 441 into low-power states are known to those skilled in the art, including various methods specified by IEEE standard 802.3az.

Energy-efficient Ethernet applications can be used to power down portions of hardware used to implement MAC layers 419 and 439, as well as some or all the circuitry used to implement subsystem controller 417 and control system controller 437. The degree to which the communications circuitry is shut down can be determined based on the requirements of applications 411 and 431, operating systems 413 and 433, subsystem controller software 415, and control system controller software 435. In addition to these considerations, as discussed previously with respect the FIGS. 1-3, whether and to what degree the communications hardware and software is placed into a power saving state is determined based on the operating environment of the vehicle in which system 400 is being implemented.

Figure 5:
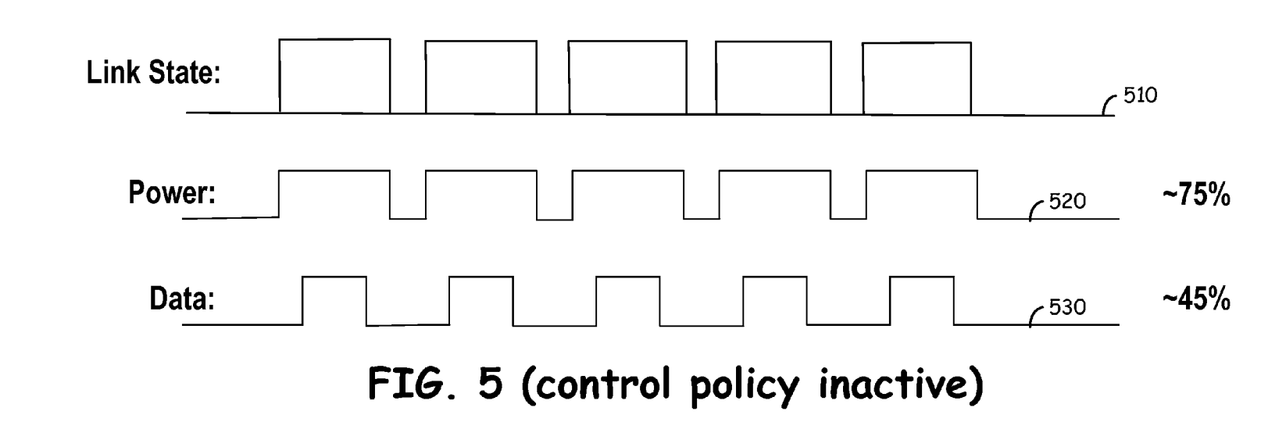
FIGS. 5 and 6 are timing diagrams illustrating relationships between Link State, Power, and Data, according to various embodiments of the disclosure.
Figure 6:
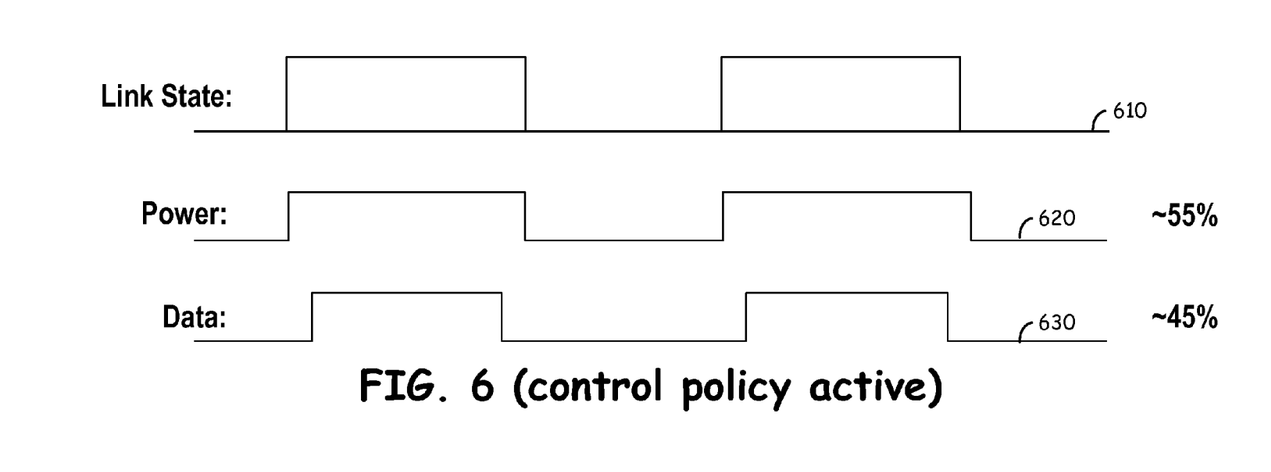

Referring next the FIGS. 5 and 6, a graph illustrating the relationship between link state, power, and data according to some embodiments of the present disclosure. FIG. 5 shows relationship between link state 510, power 520, and data 530 when no control policy is active, or when the control policy gives complete preference to responsiveness, without consideration of power savings. FIG. 6 illustrates a relationship between link state 610, link power 620, and data being transmitted via the link 630, for a case where a control policy is active.

A control policy can reduce the power used by approximately 20%, for the same percentage of data over the case where no control policy is implemented. This power savings is possible, at least in part, because a link that is fully powered at all times, as shown in FIG. 5, remains active for a period of time both before and after data is received, resulting in unnecessary "overhead" power usage when data is received sporadically. By contrast, when a transceiver is placed into a low power state under the control of an appropriate control policy the power "overhead" is incurred only during times when the link state transitions from on to off, or vice versa.

Figure 7:
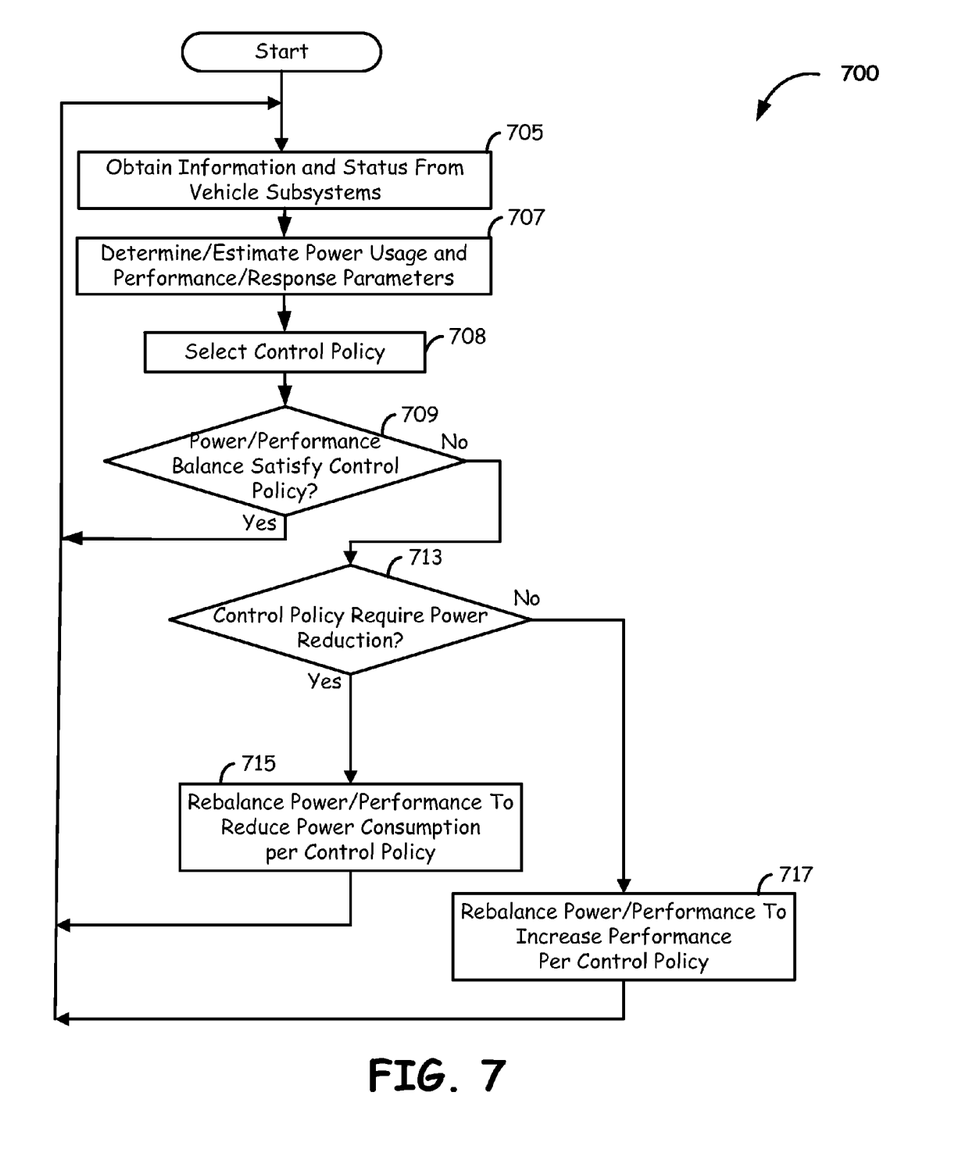
FIG. 7 is a flowchart illustrating rebalancing control capabilities and power usage, according to various embodiments of the disclosure.

FIG. 7 is a flowchart illustrating a method 700 of rebalancing power usage and performance according to various embodiments of the present disclosure. At block 705, information about the operating environment is obtained from a vehicle's subsystems or sensors. The information can be obtained from a device that is part of an automotive area network (AAN), from vehicle sensors not forming part of the AAN, from driver and passenger user inputs, or from another available source. Information about the operating environment can include measured information about the current operating environment; historical operating environment information; and information about a likely future operating environment, which can be determined based on pending driver and passenger commands, trip origination and destination information, vehicle speed, time of year, time of day, and geographical position coordinates, weather forecasts, and the like.

At block 707, power usage and performance of a device or subsystem are determined. Determining power usage and performance can include measuring current power usage and performance of specific devices, systems, and subsystems, estimating current power usage and performance based on historical power usage data and information about the current operating environment, estimating future power usage and performance based on current or historical power usage data and information about expected operating environments. In some embodiments, only power usage is calculated, and performance is treated as varying inversely to power usage.

At block 708, a control policy is selected based on the information about the operating environment and the measured or estimated power usage and performance of the device, system, or subsystems. In some embodiments, measurements and estimates of power usage and performance are made after selecting the control policy, to verify that the balance between power and performance required by the selected control policy is being met.

At block 709, a check is made to determine whether a current (or estimated balance between power and performance of the system, subsystem, or particular device satisfies the control policy currently being implemented. If the actual or estimated power/performance balance of a particular device or subsystem satisfies the currently control policy the method returns to block 705, where updated information about the operating environment of a vehicle or AAN is obtained.

If the determination at block 709 indicates that the power/performance balance of a device, system, or subsystem controlled by the AAN does not satisfy the current control policy a check is made at block 713 to determine whether the control policy requires reducing the power of a particular device or subsystem. At block 715, the relationship between power and performance of a device, system, or subsystem can be rebalanced by reducing power consumption of the device, system, or subsystem according to the control policy. Reducing the power of a particular device, system, or subsystem can include reducing the power used by a communication link used by the device, system or subsystem.

If the determination at block 713 indicates that the control policy does not require the reduction of power, a check is made at block 716 to determine whether the control policy requires the performance of the device, subsystem, or overall network to be increased. If so the method proceeds to block 717 where the power and performance of the device, system, or subsystem are rebalanced to increase the performance, in some cases even at the cost of increased power consumption. If the current power/performance does not satisfy the current control policy, but the control policy requires neither reducing power at block 713 or increasing power at block 717, method 700 returns to block 705.

Method 700 further assumes that a continuous reevaluation of power usage and performance is to be performed, although similar techniques can also apply where a reevaluation of the balance between power usage and performance is being performed in response to an expiration or start of a time period, a triggering event, or a manual initiation of a rebalancing event.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the FIG.s. Such a memory device or memory element can be included in an article of manufacture.

The present disclosure has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present disclosure may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from FIG. to FIG., the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for use in a device communicatively coupled to an automotive area network (AAN) associated with a vehicle, the method comprising:
    obtaining, by a processor, input from the vehicle, the input indicating a current operating environment of the vehicle;
    obtaining, by the processor, a control policy indicating a balance between power usage of the device and a performance level of the device for at least the current operating environment;
    controlling, by the processor, a power state of at least a physical layer (PHY) portion of a communications interface of the device based on the input from the vehicle and the control policy; and
    dynamically rebalancing the power usage and performance level of the device over time to account for changes in the operating environment of the vehicle.

2. The method of claim 1, further comprising:
    obtaining input from a vehicle-occupant profile, the profile including occupant preferences related to the control policy; and
    controlling the power state of the communications interface based, at least in part, on the occupant preferences.

3. The method of claim 1, wherein:
    the input from the vehicle comprises information associated with a destination of the vehicle and a current location of the vehicle; and
    the control policy specifies that the balance between power usage and performance is dependent upon at least the destination and the current location.

4. The method of claim 1, wherein the input from the vehicle includes vehicle sensor data.

5. The method of claim 4, further comprising:
    dynamically rebalancing the power usage and performance level of the device over time to account for changes in the operating environment of the vehicle indicated by the vehicle sensor data.

6. The method of claim 1, wherein the control policy associates a plurality of operating environments with a plurality of power and performance balances.

7. The method of claim 1, further comprising:
    disabling power over Ethernet for the device based on the input from the vehicle and the control policy.

8. The method of claim 1, wherein the obtaining a control policy comprises:
    selecting at least one of a plurality of available control policies based, at least in part, on the input from the vehicle.

9. The method of claim 1, further comprising controlling the power state of hardware associated with a media access control (MAC) layer of the device.

10. A system including multiple devices coupled to an automotive area network (AAN) associated with a vehicle, the system comprising:
    a controlled device coupled to the AAN via a communications interface;
    a controller comprising:
        memory storing one or more control policies;
        a vehicle network interface coupled to receive input from the vehicle, the input indicating a current operating environment of the vehicle;
        a processor configured to control a power state of the communications interface of the controlled device based on the input from the vehicle and the one or more control policies; and
        the processor further configured to dynamically balance a power usage and a performance level of the controlled device, over time, to account for changes in the operating environment of the vehicle.

11. The system of claim 10, wherein the controlled device further comprises:
    a device memory storing device control policies corresponding to the one or more control policies stored in the memory of the controller; and wherein
    the processor is configured to control the power state of a communications link associated with the controlled device by transmitting, to the controlled device, information indicating which of the device control policies is to be used by the controlled device.

12. The system of claim 10, further comprising:
    a vehicle subsystem coupled to the AAN via a subnet communications interface;
    the processor being further configured to control a power state of the subnet communications interface based on the input from the vehicle and the control policy.

13. The system of claim 12, wherein:
    the controller comprises a system controller; and
    the vehicle subsystem comprises a subsystem communication link controller.

14. The system of claim 10, wherein the processor is further configured to:
    select at least one of a plurality of available control policies to implement based, at least in part, on the input from the vehicle.

15. The system of claim 10, wherein the processor is further configured to:
    selectively disable power over Ethernet for the controlled device based on the input from the vehicle and the one or more control policies.

16. The method of claim 10, wherein the one or more control policies associate a plurality of operating environments with a plurality of power and performance balances.

17. A communications link controller for use in an automotive area network (AAN) associated with a vehicle, and including a device having a communications interface to be controlled, the communications link controller comprising:
    memory configured to store one or more control policies;
    a vehicle interface configured to receive input from the vehicle, the input indicating a current operating environment of the vehicle;
    a processor configured to control a power state of the communications interface of the device based on the input from the vehicle and the one or more control policies; and
    the processor further configured to dynamically balance a power usage and a performance level of the communications interface, over time, to account for changes in the operating environment of the vehicle.

18. The communications link controller of claim 17, wherein the processor is further configured to:
 select at least one of a plurality of available control policies to implement based, at least in part, on the input from the vehicle.

19. The communications link controller of claim 17, wherein the processor is further configured to:
 selectively disable power over Ethernet for the communications interface of the device, based on the input from the vehicle and the control policy.

20. The communications link controller of claim 17, wherein the one or more control policies associate a plurality of operating environments with a plurality of power and performance balances.

* * * * *